US008626875B2

(12) United States Patent
Viveganandhan et al.

(10) Patent No.: US 8,626,875 B2
(45) Date of Patent: Jan. 7, 2014

(54) STREAM SERVER SELECTION BASED ON FEEDBACK INFORMATION FROM A CLIENT

(75) Inventors: Mahesh Chakravarthy Vittal Viveganandhan, Sunnyvale, CA (US); Dipak Punnoran Koroth, San Jose, CA (US); Anil Thomas, Milipitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 592 days.

(21) Appl. No.: 12/406,857

(22) Filed: Mar. 18, 2009

(65) Prior Publication Data
US 2009/0234965 A1 Sep. 17, 2009

Related U.S. Application Data

(63) Continuation of application No. 12/047,984, filed on Mar. 13, 2008.

(51) Int. Cl.
*G06F 15/16* (2006.01)

(52) U.S. Cl.
USPC ............................ 709/219; 709/224; 709/226

(58) Field of Classification Search
USPC .................. 709/239–242, 219; 370/231–236
See application file for complete search history.

(56) References Cited

U.S. PATENT DOCUMENTS

| | | | |
|---|---|---|---|
| 5,928,331 A * | 7/1999 | Bushmitch | 709/231 |
| 6,594,260 B1 | 7/2003 | Aviani, Jr. et al. | |
| 6,742,044 B1 | 5/2004 | Aviani et al. | |
| 7,080,138 B1 | 7/2006 | Baker et al. | |
| 7,143,184 B1 | 11/2006 | Shah et al. | |
| 7,225,237 B1 * | 5/2007 | Tenereillo | 709/219 |
| 7,650,376 B1 * | 1/2010 | Blumenau | 709/203 |
| 2002/0112036 A1 * | 8/2002 | Bohannon et al. | 709/220 |
| 2003/0233478 A1 * | 12/2003 | Chuah et al. | 709/247 |
| 2005/0226196 A1 * | 10/2005 | Suh | 370/338 |
| 2005/0281205 A1 * | 12/2005 | Chandwadkar et al. | 370/249 |
| 2006/0036724 A1 * | 2/2006 | Iizuka et al. | 709/223 |
| 2007/0097987 A1 | 5/2007 | Rey et al. | |
| 2008/0028093 A1 * | 1/2008 | Pickens et al. | 709/231 |
| 2008/0270225 A1 * | 10/2008 | Beygelzimer et al. | 705/11 |

* cited by examiner

*Primary Examiner* — Christopher Biagini
(74) *Attorney, Agent, or Firm* — Merchant & Gould

(57) ABSTRACT

A technique for selecting a media streaming engine, such as a stream server, to source a media stream to a client involves receiving feedback information from a client that indicates a quality of service experienced by the client and then selecting a media streaming engine, from a set of media streaming engines, in response to the feedback information. In an embodiment, the feedback information is provided in Real-Time Control Protocol (RTCP) messages. For example, the RTCP messages are Receiver Report (RR) messages that contain packet loss and/or inter-arrival jitter information. Feedback information such as packet loss and/or inter-arrival jitter information represents the actual quality of service experienced by a client for a media stream. Because a media streaming engine is selected based on the actual quality of service experienced by a client, the selection process can be configured to optimize the quality of service of the media streaming.

20 Claims, 6 Drawing Sheets

STREAM SERVER SELECTION BASED ON FEEDBACK INFORMATION FROM A CLIENT

CROSS REFERENCE TO RELATED APPLICATIONS

The current application is a Continuation In-Part of application Ser. No. 12/047,984, filed Mar. 13, 2008, entitled "SERVER SELECTION FOR ROUTING CONTENT TO A CLIENT USING APPLICATION LAYER REDIRECTION," the entirety of which is incorporated by reference herein.

TECHNICAL FIELD

The present disclosure relates generally to digital media networks, and more particularly, to techniques for selecting a media steaming engine from which to stream digital media to a client.

BACKGROUND

Packet-based networking technology is increasingly being used to stream digital media, such as digital video, to clients. Digital media streaming involves transmitting packets of time-sensitive digital media from a media source, such as a stream server, to a client, such as a personal computer or a digital set-top-box (STB). As an example, digital media is streamed downstream from a stream server to a STB using Motion Picture Expert Group (MPEG)-2 Transport Stream (TS) over UDP/IP or Real-time Transport (RTP)/UDP/IP.

Service provider networks that support digital media streaming often times have multiple different stream servers from which a particular media stream can be sourced. When a request for a media stream is made by a client, a stream server must be selected to source the media stream. While it may be easy to simply select the stream server that is physically closest to the client to source the media stream, selecting the closest stream server to the client does not necessarily provide the best result to the client.

SUMMARY

A technique for selecting a media streaming engine, such as a stream server, to source a media stream to a client involves receiving feedback information from a client that indicates a quality of service experienced by the client and then selecting a media streaming engine, from a set of media streaming engines, in response to the feedback information. In an embodiment, the feedback information is provided in Real-Time Control Protocol (RTCP) messages. For example, the RTCP messages are Receiver Report (RR) messages that contain packet loss and/or inter-arrival jitter information. Feedback information such as packet loss and/or inter-arrival jitter information represents the actual quality of service experienced by a client for a media stream. Because a media streaming engine is selected based on the actual quality of service experienced by a client, the selection process can be configured to optimize the quality of service of the media streaming.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DESCRIPTION OF EXAMPLE EMBODIMENTS

Figure 1:
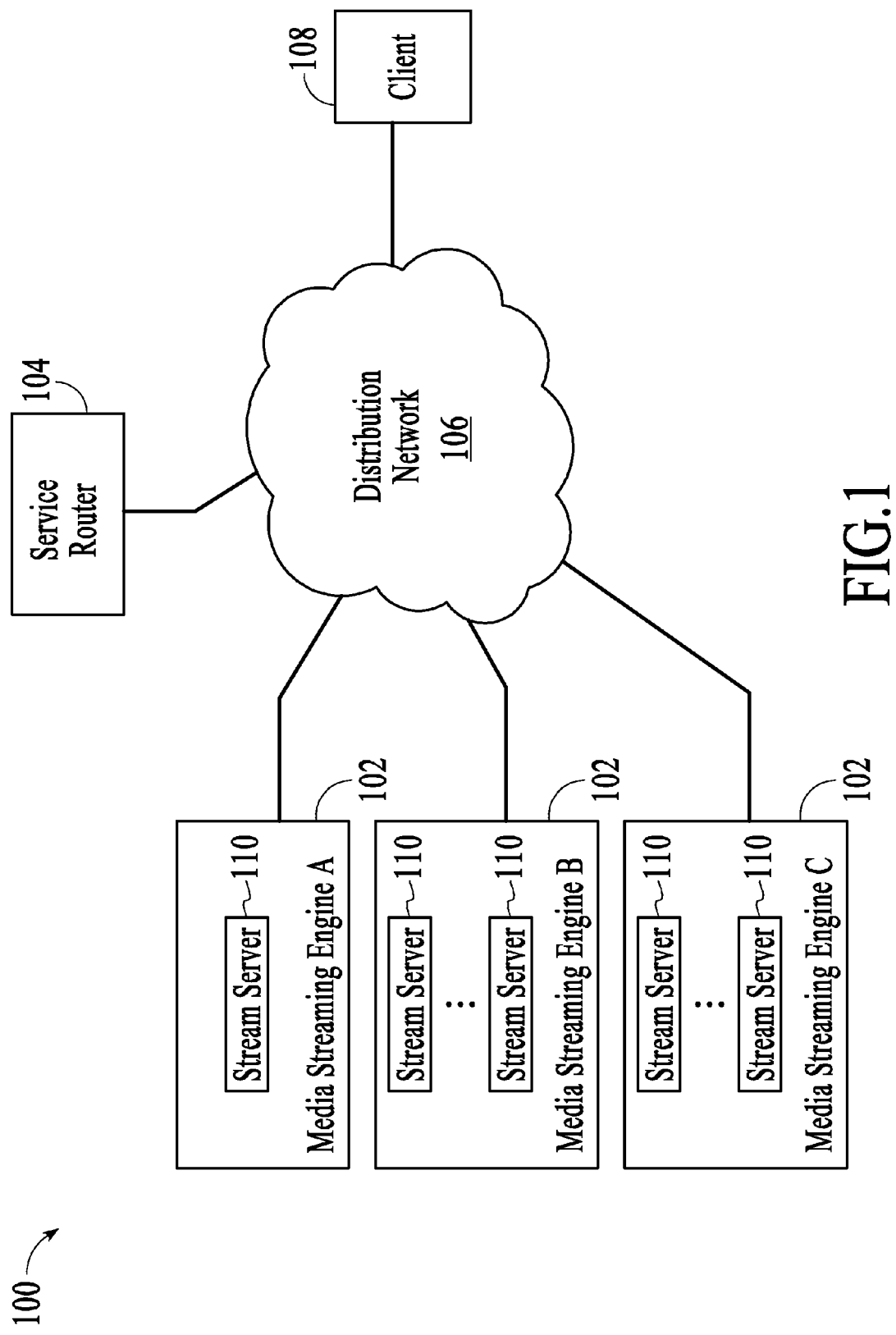
FIG. 1 depicts an embodiment of a system for streaming digital media to a client that includes media streaming engines, a service router, a distribution network, and a client.

FIG. 1 depicts an embodiment of a system 100 for streaming digital media to a client. The system includes media streaming engines 102, a service router 104, a distribution network 106, and a client 108. The system is able to stream digital media from any one of the media streaming engines to the client. As an example, digital video content is streamed downstream from one of the media streaming engines to the client using Motion Picture Expert Group (MPEG)-2 Transport Stream (TS) over UDP/IP or Real-time Transport (RTP)/UDP/IP.

In the system 100 of FIG. 1, the media streaming engines 102 are elements that are configured to stream digital media, such as digital video or digital music, to the client 108. Each of the media streaming engines includes at least one stream server 110, which ingests digital media from a media source (not shown) and streams the digital media into the distribution network 106. In an embodiment, each of the media streaming engines includes a session controller (not shown) that monitors and controls stream sessions that are supported by the respective media streaming engine. A media streaming engine may include multiple stream servers that are managed as a group. For example, the stream servers may be logically grouped, geographically grouped, and/or physically s grouped. Stream servers located in different geographic locations (e.g., San Francisco and Los Angles) could be logically managed as a group even though they are in different geographic locations. Stream servers that are located in the same geographic location could be managed as a group even if the stream servers are not located in the same building and/or server rack and stream servers that are located in the same physical location (e.g., the same Video Hub Office (VHO) or the same server rack) could be managed as a group. Whatever the case, the media streaming engines depicted in FIG. 1 are each considered as a single resource for the purpose of selecting a media streaming engine to source a media stream to the client.

The service router 104 is configured to mediate requests from the client 108. In particular, the service router is responsible for choosing the most appropriate media streaming engine 102 to source a requested media stream. In an embodiment, the service router can select the media streaming engine based on the location of the client and/or media streaming engine, the status of the media streaming engines, and/or load conditions, including network load conditions and load conditions of the media streaming engines. Once a media streaming engine is selected, the service router redirects the client to the selected media streaming engine to begin a media streaming session. Various Hyper-Text Transfer Protocol (HTTP) and Real-Time Streaming Protocol (RTSP) based techniques can be utilized to implement the redirects. In an embodiment, the service router maintains a topology map, which is an administrative configuration to indicate the mapping between the client subnets and/or locations and a list of available media streaming engines. The list could include stream servers from multiple media streaming engines, each of the stream servers having an associated initial cost metric. The service router updates the topology map based on input such as keepalive messages from the media streaming engines.

The distribution network 106 between the media streaming engines 102 and the client 108 is any type of network that supports packet-based media streaming. The distribution network may include, for example, transport network, wide area network (WAN), metropolitan area network (MAN), and/or local area network (LAN) technologies. The distribution network may be wired, wireless, or a combination thereof In an embodiment, a "last-mile" portion of the network may be a cable-based network, a s digital subscriber line (DSL) network, a passive optical network (PON), or a wireless access network. The distribution network may utilize, for example, IP, Ethernet, ATM, or a combination thereof to stream digital media to the client.

In the system 100 of FIG. 1, the client 108 is an element that receives streamed digital media from one of the media streaming engines 102 via the distribution network 106 and provides the digital video content to a media playout device such as a television or a music player. The client may be embodied as hardware, firmware, software, or any combination thereof In an embodiment, the client is embodied within a personal computer, a set-top-box (STB), a Wi-Fi connected mobile phone, or a personal digital assistant. The client may also serve other functions such as establishing a media session with one of the media streaming engines. In an embodiment, the client manages Network Layer (Layer 3) and Transport Layer (Layer 4), and Application Layer (Layer 5) communications between the client, the service router 104, and the media streaming engines.

Although only one client 108 is depicted in FIG. 1, there may be more than one client connected to the distribution network 106. Communications between the client and the media streaming engines 102 may utilize unicasting or multicasting. Multicasting typically involves replicating packets at nodes that include multiple branches leading to different clients. The replication of packets at branching nodes eliminates the need to send multiple packets of the same content over the same link. Unicasting typically involves point-to-point messaging between nodes (e.g., servers and clients). Point-to-point messaging can be accomplished, for example, using well-known source/destination address based protocols (e.g., IP or Ethernet).

In operation, when the client 108 requests a particular piece of digital media, one of the media streaming engines 102 must be selected to source the digital media stream. In accordance with an embodiment of the invention, feedback information from a client, which indicates a quality of service experienced by the client, is used to select a media stream engine to source the requested media stream. In an embodiment, the feedback information is provided in RTCP RR messages that contain packet loss and/or inter-arrival jitter information. The packet loss and/or inter-arrival jitter information represents the actual quality of service experienced by a client for a media stream. Because a media streaming engine is selected based on the actual quality of service experienced by a client, the selection process can be configured to optimize the quality of service of the media streaming.

An embodiment of a technique for selecting a media streaming engine is described with reference to FIGS. 2A-2C. The technique utilizes feedback information in RTCP RR messages that are received from the client 108 to select a media streaming engine. The feedback information reflects actual conditions experienced by the client that has received a media stream.

Figure 2A:
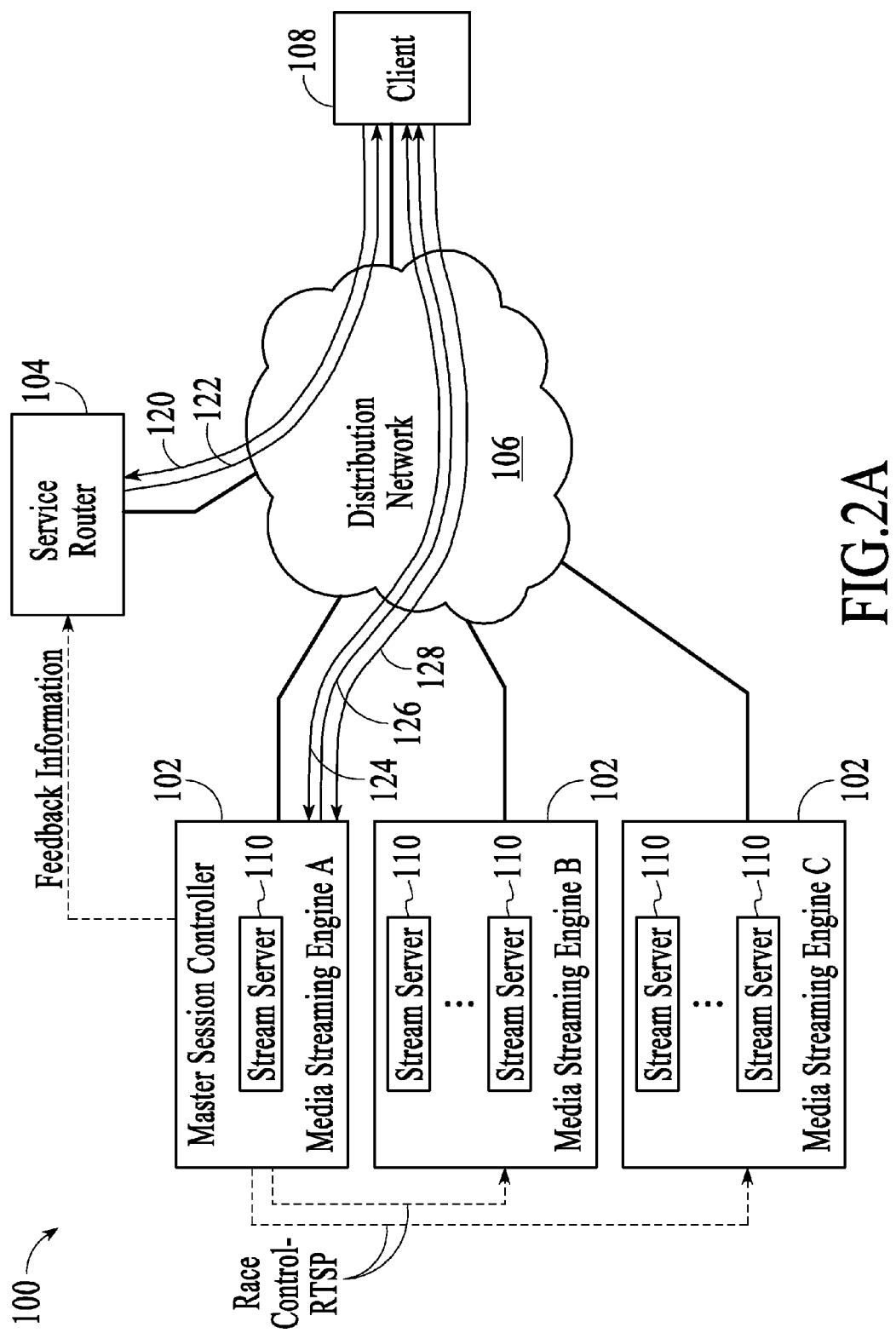
FIGS. 2A-2C illustrate an embodiment of a technique for selecting a media streaming engine.
Figure 2B:
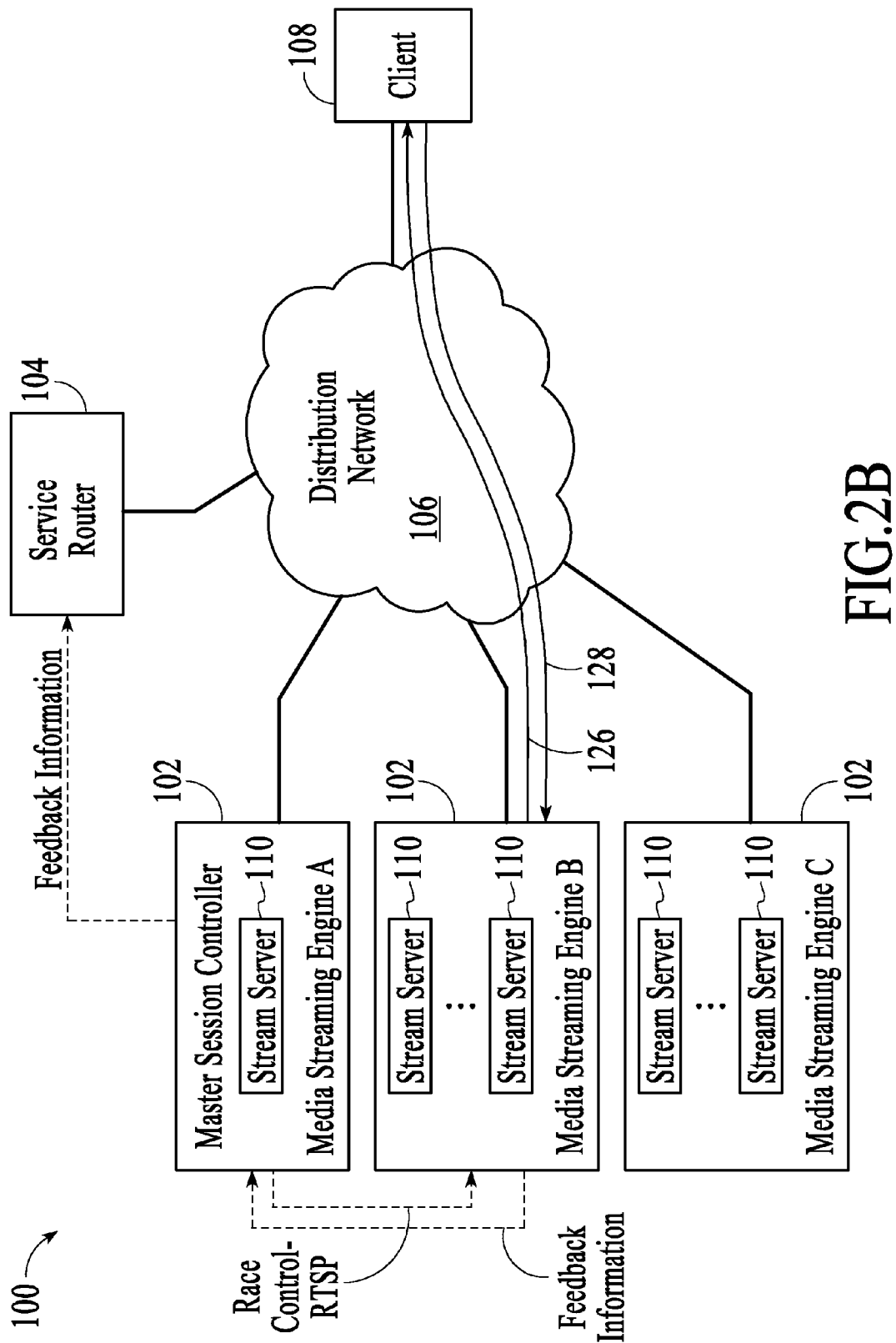
Figure 2C:
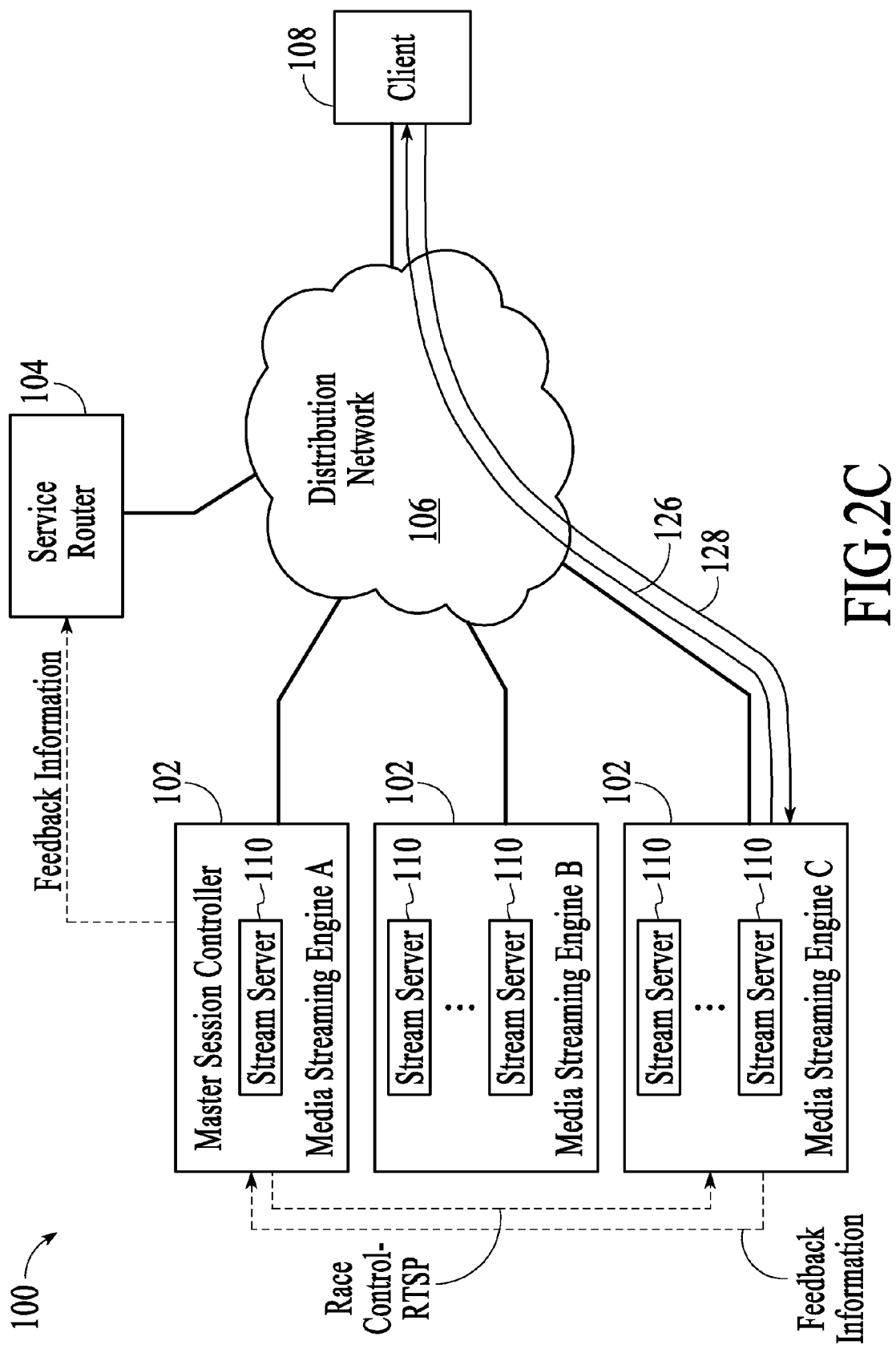

With reference to FIG. 2A, a request 120 for a media stream is made by the client 108 and received by the service router 104. As is known in the field, communications can be in the form of RTSP messages, which include DESCRIBE, SETUP, PLAY, PAUSE, RECORD, and TEARDOWN messages, see Internet Engineering Task Force (IETF) Request for Comment (RFC) 2326, which is incorporated by reference herein. In an embodiment, the request is in the form of an RTSP DESCRIBE message. An example of an RTSP DESCRIBE message from the client to the service router is as follows:

DESCRIBE rtsp://edn.vault.com/content.mov RTSP/1.0
CSeq: 1
Accept: application/sdp
Bandwidth: 384000
Accept-Language: en-US
User-Agent: QuickTime/7.4.1 (qtver=7.4.1;os=Windows NT 5.1Service Pack 2)

Upon receipt of the request, the service router 104 identifies a set of media streaming engines that could source the requested media stream. For example, the service router identifies three media streaming engines that are able to source the requested media stream, although the exact number of media streaming engines that are identified is implementation specific. The set of media streaming engines could be selected based on various different criteria such as the location of the client and/or media streaming engine, the status of the media streaming engines, and/or load conditions, including network load conditions and/or load conditions of the media streaming engines.

In addition to identifying the set of media streaming engines, one of the media streaming engines in the set is selected to be the master session controller for the client request. Media streaming engine A is identified as the master session controller. The master session controller manages the media session for the life of the session. The master session controller may also monitor feedback from participating media streaming engines and propagate the feedback information to the service router. Once the master session controller is identified, the client 108 is redirected to the master session controller using, for example, a redirect message 122, FIG. 2A. In an embodiment, the redirect message also includes an identification of the other media streaming engines in the set of media streaming engines. An example of a redirect message from the service router to the client is as follows:

RSTP/1.0 302 Moved Temporarily
CSeq: 1
Location:
Rtsp://MSE-A.se.edn.vault.com/content.mov?race_with=MSE-B,MSE-C In the example redirect message, media streaming engine A, MSE-A, is the master session controller for this stream session and media streaming engines B and C, MSE-B and MSE-C, are the participants for the stream session.

Once the redirect message 122 is received by the client 108, the client follows the redirect message and contacts the master session controller to set up the media stream. In an embodiment, the client sends RTSP SETUP and PLAY messages, 124 FIG. 2A, to the master session controller to set up and play the media stream. The client and/or the media streaming engine may send other RTSP messages to further manage the session. In response to the RTSP SETUP and PLAY messages, the media streaming engine begins to stream digital media to the client, for example, using MPEG2-TS RTP/UDP/IP, represented as media stream 126 in FIG. 2A. When the RTP protocol is used to stream the digital media to the client, the client generates RTCP RR messages and sends the RTCP RR messages upstream to the media streaming engine. RTCP is fully described in IETF RFC 1889 and 1890, both of which are incorporated by reference herein. The RTCP RR messages include feedback information 128, which is indicative of a quality of service experienced by the client. For example, the RTCP RR messages include the highest packet number received, packet loss, inter-arrival jitter, and timestamp information, which is indicative of the actual conditions experienced by the client with respect to the media stream that is sourced by the specific media streaming engine. As such, the feedback information provided by the RTCP RR messages is specific to a media streaming engine and client pair.

The media streaming engine 102 evaluates the feedback information to see if the quality of service is satisfactory. For example, the packet loss and inter-arrival jitter information is compared to respective packet loss and inter-arrival jitter thresholds to see if the thresholds are exceeded. If the quality of service is found to be unsatisfactory, e.g., the packet loss or inter-arrival jitter threshold is exceeded, then the master session controller begins a process of evaluating the other media streaming engines in the set of media streaming engines to see if any of the other media streaming engines can provide a satisfactory quality of service. In an embodiment, the master session controller triggers the other media streaming engines in the set to be evaluated one-by-one to find a media streaming engine that can source the media stream at a satisfactory quality of service. The process of evaluating the other media streaming engines in the set is referred to herein as a "race."

In an embodiment, the master session controller first checks to see if one of the other media streaming engines 102, referred to herein as the "next" media streaming engine, is available to source the media stream. If the next media streaming engine is available, then the media stream is switched over to the next media streaming engine. In order to make a seamless switch to the next media streaming engine, stream state information is passed to the next media streaming engine so that the media stream can be started at the right point. For example, the current streaming state information is passed on so that the next media streaming engine can start from the correct normal play time (NPT) and use the required synchronization source (SSRC), RTP timestamp, and/or an offset within the media file from which the media stream is sourced.

Once the media stream is switched over, the client begins to receive the media stream from the next media streaming engine. FIG. 2B illustrates the system after s the media stream has been switched over to media streaming engine B. In response to the media stream 126, the client begins sending RTCP RR messages to the sourcing media streaming engine. As with the first media streaming engine, the sourcing media streaming engine evaluates the feedback information 128 that is carried in the RTCP RR messages to determine if the quality of service is satisfactory. If the quality of service is satisfactory, the media streaming engine continues to source the media stream. The media streaming engine may also provide the feedback information to the master session controller.

If the quality of service is unsatisfactory, the media streaming engine 102 notifies the master session controller and the master session controller initiates a switch to the next media streaming engine in the set of media streaming engines. FIG. 2C illustrates the system after the media stream has been switched over to media streaming engine C. As with FIG. 2B, the client will send RTCP RR messages, which carry feedback information, to the sourcing media streaming engine. The process can be repeated amongst the media streaming engines in the set of media streaming engines until one of the media streaming engines is found to provide a satisfactory quality of service to the client.

Whenever feedback information is received by a media streaming engine, the feedback information is provided to the master session controller. The master session controller in turn provides the feedback information to the service router 104, which can use the feedback information to make future media streaming engine selections. The master session controller can pre-process the feedback information before sending the feedback information to the service router and/or the master session controller can provide raw feedback information to the service router.

The above-described technique for selecting a media streaming engine involves the collection of feedback information "on-the-fly." In an alternative embodiment, feedback information that has already been collected can be used up front by the service router to select a media streaming engine in response to a request. For example, the service router can compare the feedback information from all of the media streaming engines in the set to each other. The media streaming engine that has provided the best quality of service to the client, e.g., as indicated by the packet loss and inter-arrival jitter information, is then selected to source the media stream. The up-front use of previously collected feedback information can speed up the selection of the optimal media streaming engine because the above-described process of collecting and evaluating the feedback information has already been completed. In another embodiment, previously collected feedback information is used in the initial selection of the set of media streaming engines and then subsequently collected feedback information is evaluated as described above to fine tune the media streaming engine selection.

The above-described techniques can be used to select media streaming engines on a client-by-client basis or to select media streaming engines on a client subnet basis. For example, feedback information can be applied to select a media streaming engine based on the complete IP address of the client or based on the IP subnet to which the client belongs. In an embodiment, all clients from a certain subnet are treated similarly, e.g., the same media streaming engine is selected to service their requests. Using this technique, the feedback information used to select a media streaming engine for a client is not necessarily feedback information that was generated by the particular client itself Ultimately, the use of feedback information, as provided in the RTCP RR messages, enables the optimal media streaming engine to be selected. In an embodiment, the optimal media streaming engine is the media streaming engine that provides the highest quality of service to the client, where the highest quality of service corresponds to the fewest lost packets and/or the lowest inter-arrival jitter. Although the feedback information is one criterion used in the selection process, other criteria may also be considered in selecting the optimal media streaming engine to source a media stream.

Network conditions tend to be very dynamic in nature especially in networks that provide bandwidth intensive services such as media streaming. Because of the dynamic nature of network conditions, in an embodiment, heuristic information is generated from the feedback information and the heuristic information is used to select media streaming engines. For example, heuristic information may be collected on a subnet basis to characterize the quality of service experienced by the subnet on a per-time interval basis, e.g., per hour of the day or per day of the week basis.

The master session controller and the media streaming engines may communicate with each other using, for example, RTSP messages. In an embodiment, the master session controller uses RTSP SETUP/PLAY messages with header extensions to initiate and manage the switching between media streaming engines, i.e., the race. Additionally, the media streaming engines may use RTSP ANNOUNCE/SET_PARAMETER messages to send feedback information to the master session controller.

Figure 3:
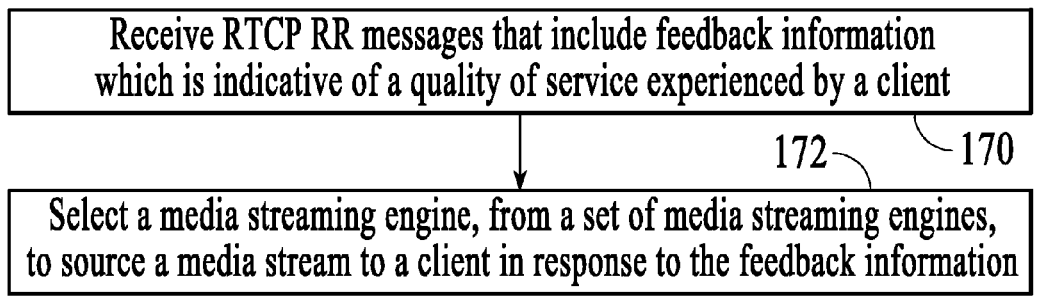
FIG. 3 is a process flow diagram of a method for selecting a media streaming engine to source a media stream to a client.

FIG. 3 is a process flow diagram of a method for selecting a media streaming engine to source a media stream to a client. At block 170, RTCP RR messages, which include feedback information that is indicative of a quality of service experienced by a client, are received. At block 172, a media streaming engine is selected from a set of media streaming engines to source a media stream to a client in response to the feedback information. In this embodiment, the feedback information is not necessarily generated by the same client that has made the request.

Figure 4:
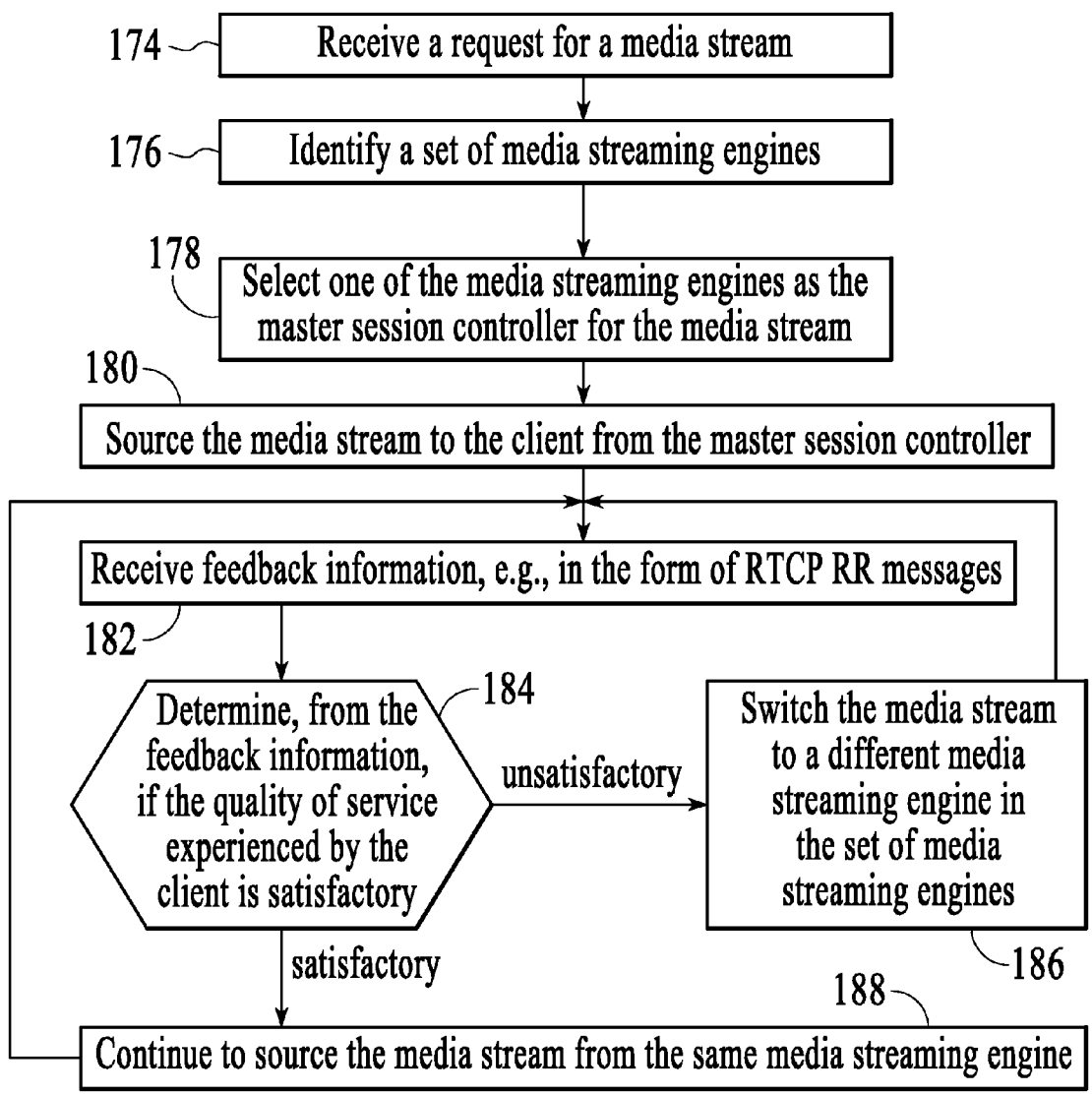
FIG. 4 is a process flow diagram of another method for selecting a media streaming engine to source a media stream to a client.

FIG. 4 is a process flow diagram of another method for selecting a media streaming engine to source a media stream to a client. At block 174, a request for a media stream is received. At block 176, a set of media streaming engines is identified, for example a set of N media streaming engines is identified. At block 178, one of the media streaming engines is selected as the master session controller for the media stream. At block 180, the media stream is sourced to the client from the master session controller. At block 182, feedback information, e.g., in the form of RTCP RR messages, is received. At decision point 184, the feedback information is used to determine if the quality of service experienced by the client is satisfactory. If the quality of service experienced by the client is unsatisfactory, then at block 186, the media stream is switched to a different media streaming engine in the set of media streaming engines and the process returns to block 182. On the other hand, if the quality of service experienced by the client is satisfactory, then at block 188, the media stream continues to be sourced by the same media streaming engine and the process returns to block 182.

Figure 5:
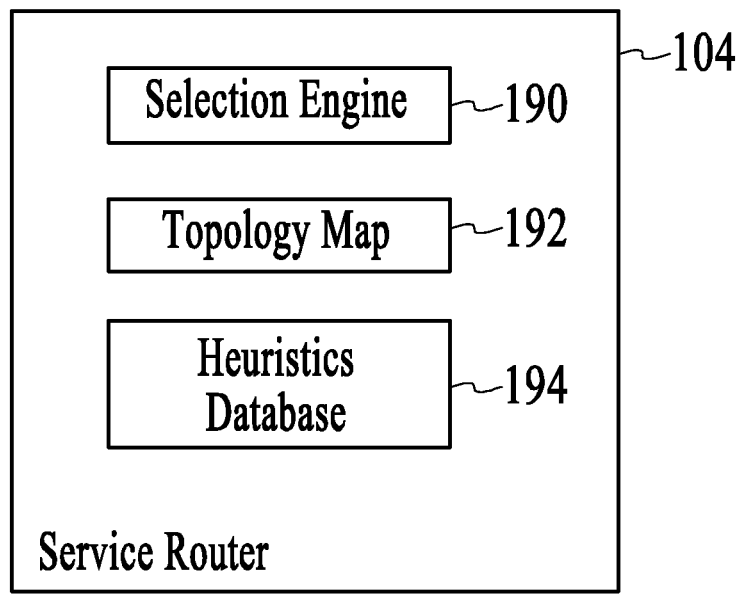
FIG. 5 is a functional block diagram of an embodiment of the service router depicted in FIGS. 1 and 2A-2C.

FIG. 5 is a functional block diagram of an embodiment of the service router 104 depicted in FIGS. 1 and 2A-2C. The service router includes a selection engine 190, a topology map 192, and a heuristics database 194. The selection engine is configured to implement a selection process as described above, the topology map includes location information on the media streaming engines, and the heuristics database includes heuristic information that is generated from the feedback information received from the clients.

Figure 6:
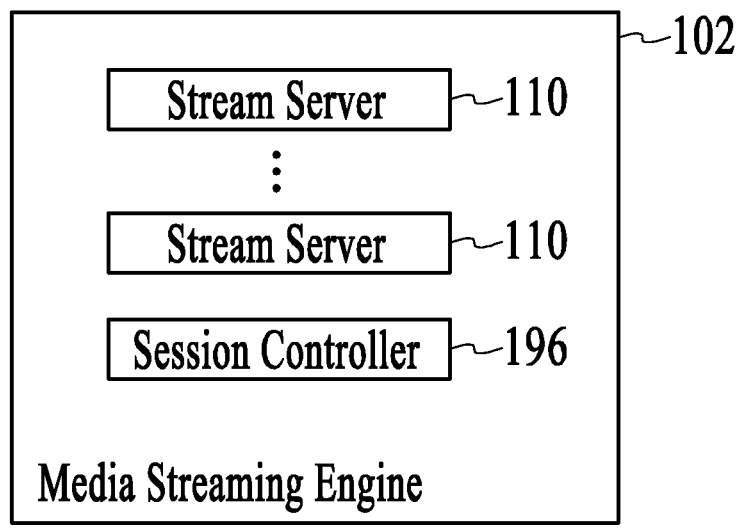
FIG. 6 is a functional block diagram of an embodiment of the media streaming engines depicted in FIGS. 1 and 2A-2C.

FIG. 6 is a functional block diagram of an embodiment of the media streaming engines 104 depicted in FIGS. 1 and 2A-2C. The media streaming engine includes stream servers 110 and a session controller 196. As described above, when a particular media streaming engine is designated as the master session controller, the session controller 196 carries out the above-described master session controller functions.

In an embodiment, algorithms may be implemented to achieve time-smoothing in order to extract the relative goodput to be obtained by the different stream servers over the time scale of streaming sessions. That is, an algorithm may be implemented to ensure that the switching of stream servers is not too reactive to short term changes in the feedback information. For example, it may be desirable to damp short-term spikes/changes in the feedback information, while not overweight long-term averages that don't correspond to the current load distribution.

In an embodiment of a smoothing algorithm, a Feedback Processing Interval is defined as the interval, N, over which the feedback information from the clients is aggregated/normalized and a Tolerance Threshold is defined as a value, which when exceeded, makes the feedback unsatisfactory. According to the algorithm, over the Feedback Processing Interval N, a running score is started. The running score gets modified every time an RTCP RR message is received from a client. RTCP RR messages having feedback information that exceeds the Tolerance Threshold causes the running score to be decremented by a value, D, and RTCP RR messages having feedback information that is within the Tolerance Threshold causes the running score to be incremented by a value, I. At the end of the Feedback Processing Interval, N, the running score is inspected and if the running score is greater than or equal to zero, then the streaming experience is considered satisfactory and if the running score is less than zero, the streaming experience is considered unsatisfactory. Although one example of a smoothing algorithm is described, other smoothing algorithms may be implemented.

In another embodiment, an algorithm may be implemented to filter out loss and/or jitter that is independent of stream server selection from the loss and/or jitter that is different from different stream servers, under the time horizon constraints above.

At least some of the operations of the above-described techniques may be implemented using software instructions stored on a computer useable storage medium for execution by a computer. As an example, an embodiment of a computer program product includes logic encoded in one or more tangible media for execution and when executed, causes the computer to perform operations, as described above.

Embodiments of the above-described technique can take the form of an entirely hardware embodiment, an entirely software embodiment, or an embodiment containing both hardware and software elements. In one embodiment, the above-described technique is implemented in software, which includes but is not limited to firmware, resident software, microcode, etc.

Furthermore, embodiments of the above-described technique can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and high-definition (HD) disks such as Blu-Ray and HD-DVD.

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Although specific embodiments of the invention have been described and illustrated, the invention is not to be limited to the specific forms or arrangements of parts as described and illustrated herein. The invention is limited only by the claims.

What is claimed is:

1. A method for selecting a media streaming engine to source a media stream to a client, the method comprising:
   accumulating, at a service router, historical Real-Time Control Protocol (RTCP) Receiver Report (RR) messages wherein the RTCP RR messages contain feedback information related to at least one of packet loss and inter- arrival jitter;
   receiving a request from a client for a media stream;
   selecting a set of media streaming engines, to source the media stream to the client;
   selecting a master controller from the set of media streaming engines in response to at least one of the packet loss and the inter-arrival jitter as contained in the the accumulated RTCP RR messages;
   redirecting the client to the master controller to begin a media streaming session;
   receiving at the master controller a feedback information from the client; and
   evaluating, by the master controller, the feedback information received from the client, wherein evaluating the feedback information comprises:
       determining a feedback processing interval and a tolerance threshold, and
       creating a score for the feedback processing interval, wherein the feedback score is decremented by one if the feedback information is below the tolerance threshold and is incremented by one otherwise.

2. The method of claim 1, further comprising:
   evaluating the score at the end of the feedback processing interval and determining if a quality of service is satisfactory; and
   if the quality of service is unsatisfactory, sourcing the media stream from a next media streaming engine in the set of the media streaming engines and evaluating feedback information related to the media stream sourced by the next media streaming engine.

3. The method of claim 2, further comprising:
   if the quality of service is unsatisfactory from all of the media streaming engines in the set of media streaming engines, comparing the evaluated feedback information from all of the media streaming engines to each other; and
   selecting the media streaming engine in response to the comparison of the feedback information.

4. The method of claim 2, wherein evaluating feedback information related to the media stream sourced by the next media streaming engine comprises initiating by the master controller collection of feedback information related to the next media streaming engine in the set of media streaming engines.

5. The method of claim 2 further comprising passing stream state information to the next media streaming engine so that the media stream can be started at a correct normal playtime (NPT).

6. The method of claim 2, wherein determining if the quality of service is satisfactory comprises determining the quality of service satisfactory if the feedback score is above a predetermined value.

7. The method of claim 1, wherein selecting the set of media streaming engines comprises selecting a set of media streaming engines in response to a topology map that indicates a mapping between client subnets or locations and available media streaming engines.

8. The method of claim 1, wherein selecting the master controller comprises selecting the master controller on a client subnet basis such that clients from a certain subnets are serviced by the same master controller.

9. The method of claim 1, further comprising the master controller and the media streaming engines communicating with each other using RTSP messages.

10. The method of claim 1, wherein determining the feedback processing interval comprises determining the feedback processing interval to damp short-term spikes and changes in the feedback information.

11. The method of claim 1, wherein determining the feedback processing interval comprises determining the feedback processing interval to not over weight long term averages that do not correspond to a current load distribution.

12. The method of claim 1, wherein determining the tolerance threshold comprises determining a minimum value of at least one of: highest packet number received, packet loss, timestamp information, and inter-arrival jitter.

13. The method of claim 1, wherein selecting the set of media streaming engines, comprises:
   determining a subnet associated with the client; and
   determining the set of media streaming engines based on accumulated feedback information for the subnet.

14. The method of claim 1, wherein selecting the master controller comprises selecting the master controller based on a heuristic information, the heuristic information being generated from the feedback information, wherein the heuristic information is generated on a subnet basis to characterize a quality of service experienced by the subnet on a predetermined time interval basis.

15. A method for selecting a media streaming engine to source a media stream to a client, the method comprising:
   sourcing media streams to a first client from multiple different media streaming engines;
   receiving feedback information that indicates a quality of service experienced by the first client related to each of the media streams that is sourced from the multiple different media streaming engines, wherein the feedback information is media streaming engine-specific and wherein the feedback information is provided in Real-Time Control Protocol (RTCP) Receiver Report (RR) messages that contain feedback information related to at least one of packet loss and inter-arrival jitter;
   receiving a request from a second client for a media stream;
   selecting a media streaming engine, from the multiple different media streaming engines, to source the media stream to the second client in response to the previously received media streaming engine-specific feedback information;
   redirecting the second client to the selected media streaming engine to begin a media streaming session;
   receiving at the selected media streaming engine a feedback information from the second client; and
   evaluating the feedback information received from the second client wherein evaluating the feedback information comprises:

determining a feedback processing interval and a tolerance threshold, and creating a score for the feedback processing interval, wherein the score is decremented by one if the feedback information is below the tolerance threshold and is incremented by one otherwise.

16. The method of claim 15, wherein selecting a media streaming engine further comprises an initial step of selecting a set of media streaming engines.

17. The method of claim 16, wherein selecting the set of media streaming engines comprises selecting the set of media streaming engines in response to a topology map that indicates the mapping between at least one of: second client subnets and second client locations, and available media streaming engines.

18. The method of claim 16 further comprising selecting one of the media streaming engines as a master session controller, wherein the master session controller initiates the collection of feedback information related to the other media streaming engines in the set of media streaming engines.

19. A system for selecting a media streaming engine to source a media stream to a client, the apparatus comprising:
a processor and memory configured to implement a service router that collects feedback information for a plurality of media streaming engines, wherein the feedback information is received by the media streaming engines from clients, and wherein the feedback information is provided from the clients in Real-Time Control Protocol (RTCP) Receiver Report (RR) messages and wherein the RTCP RR messaged contain feedback information related to at least one of packet loss and inter-arrival jitter, the service router having a selection engine configured to:
receive a request from a client to source a media stream;
use the previously collected feedback information, including at least one of the packet loss and the inter-arrival jitter as contained in the RTCP RR messages, to select a media streaming engine to source the media stream to the client; and
redirect the client to the selected media streaming engine to begin a media streaming session, wherein the selected streaming media engine is configured to:
receive a feedback information from the client;
evaluate the feedback information wherein evaluating the feedback information comprises:
determine a feedback processing interval and a tolerance threshold, and
create a score for the feedback processing interval, wherein the score is decremented by one if the feedback information is below the tolerance threshold and is incremented by one otherwise.

20. The system of claim 19, wherein the selected media streaming engine is further configured to:
evaluate the score at the end of the feedback processing interval and determining if a quality of service is satisfactory;
if the quality of service is unsatisfactory, source the media stream from a next media streaming engine in a set of the media streaming engines; and
evaluate feedback information related to the media stream sourced by the next media streaming engine.

* * * * *